(12) United States Patent
Kambouris et al.

(10) Patent No.: US 6,367,642 B2
(45) Date of Patent: Apr. 9, 2002

(54) DOCUMENT RETAINING SYSTEM

(75) Inventors: Thomas C. Kambouris, Jackson, WY (US); Gene A. Barker, Wayne, ME (US)

(73) Assignee: Saunders Manufacturing Company, Inc., Readfield, ME (US)

(*) Notice: Subject to any disclaimer, the term of this patent is extended or adjusted under 35 U.S.C. 154(b) by 0 days.

(21) Appl. No.: 09/756,584

(22) Filed: Jan. 8, 2001

Related U.S. Application Data

(63) Continuation-in-part of application No. 09/215,570, filed on Dec. 16, 1998, now Pat. No. 6,196,405.

(51) Int. Cl.[7] .............................................. B65D 43/00
(52) U.S. Cl. ....................... 220/4.22; 220/4.02; 206/701
(58) Field of Search .............................. 220/4.22, 4.02, 220/812; 206/521, 701

(56) References Cited

U.S. PATENT DOCUMENTS

| | | | |
|---|---|---|---|
| 4,048,050 A | 9/1977 | Hillman | 206/1.5 |
| 5,203,469 A | 4/1993 | Chang et al. | 220/331 |
| 5,207,342 A * | 5/1993 | Tsuji et al. | 220/4.02 |
| 5,392,906 A | 2/1995 | Taniyama | 206/311 |
| 5,495,389 A * | 2/1996 | Dewitt et al. | 220/4.02 X |
| 5,697,955 A * | 12/1997 | Stolte | 206/701 X |
| 6,196,405 B1 * | 3/2001 | Kambouris | 220/4.22 |

* cited by examiner

*Primary Examiner*—Steven Pollard
(74) *Attorney, Agent, or Firm*—Michael S. Neustel

(57) ABSTRACT

A document retaining system for retaining documents in a protected manner while allowing easy and convenient access to the documents. The inventive device includes a base having a pair of opposing slots, and a cover having a pair of opposing pins that are slidably positioned within the slots. The cover is formed to removably fit within the interior cavity of the base and for removably covering the interior cavity of the base. Various documents may be stored and utilized within the base and the cover along with various auxiliary devices such as clamps and partition members.

20 Claims, 10 Drawing Sheets

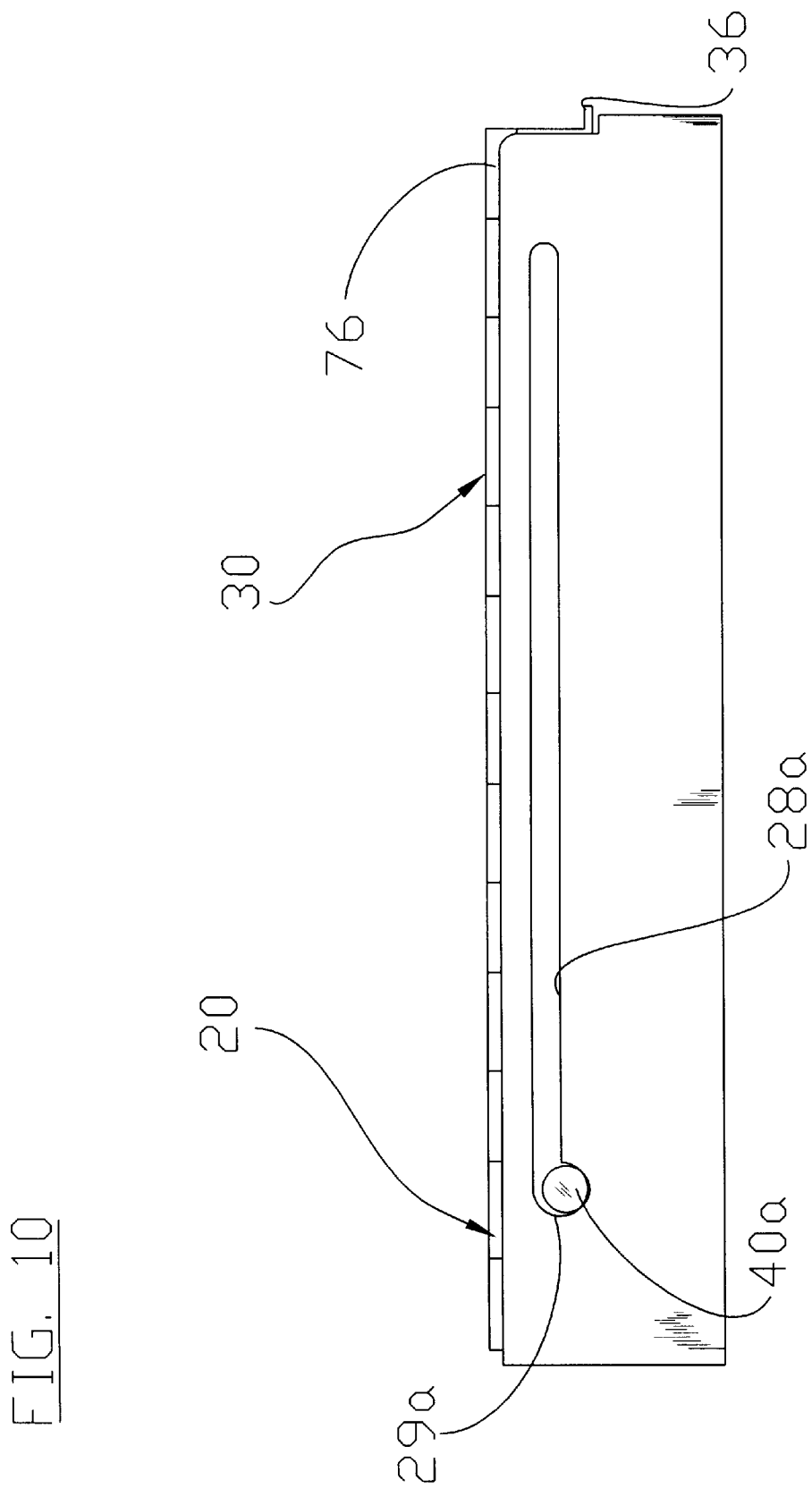

DOCUMENT RETAINING SYSTEM

CROSS-REFERENCE TO RELATED U.S. PATENT APPLICATION

I hereby claim benefit under Title 35, United States Code, Section 120 of U.S. patent application Ser. No. 09/215,570 filed Dec. 16, 1998, now U.S. Pat. No. 6,196,405, entitled Personal Organizer Case System. This application is a continuation-in-part of the appplication Ser. No. 09/215,570. The application Ser. No. 09/215,570 has received a Notice of Allowance mailed Oct. 10, 2000 and is currently pending as of the filing of this application. The application Ser. No. 09/215,570 is hereby incorporated by reference into this application.

BACKGROUND OF THE INVENTION

1. Field of the Invention

The present invention relates generally to document holder devices and more specifically it relates to a document retaining system for retaining documents in a protected manner while allowing easy and convenient access to the documents.

Individuals in various professions and industries commonly utilize document holder devices to retain various types of documents. Unfortunately many of these document holder devices are not comprised of a suitable compact structure during usage by an individual making them difficult to manually support and utilize. Hence, there is a need for a document retaining system that performs all of the functions of conventional document retaining systems in a convenient manner.

2. Description of the Prior Art

Document holder devices have been in use for years. Conventional document holder devices typically include but are not limited to form holders, work boxes, clipboards, clipboards with writing plates, sheet holders, drivers log book covers, portfolios, ring binders, and citation holders. Conventional document holder devices typically are constructed to retain and protect documents such as papers, forms, tablets and other items. Conventional document holder devices having two or more pivotally attached door members (or flaps) are common in the industry that expand outwardly in a wing-manner when the user desires to access the documents contained within. Conventional document holder devices often times have a storage area along with a writing plate.

The main problem with conventional document holder devices is that they are cumbersome to utilize. Another problem is that conventional document holder devices are difficult to physically support and write upon for many individuals because of the pivotally attached doors. Conventional clipboards are easy to utilize, however they do not protect documents from being damaged or visually seen by unauthorized individuals.

While these devices may be suitable for the particular purpose to which they address, they are not as suitable for retaining documents in a protected manner while allowing easy and convenient access to the documents. Conventional document retaining devices are bulky and awkward to utilize. In addition, conventional document retaining devices generally have a lid or cover that is pivoted outwardly that interferes with usage.

In these respects, the document retaining system according to the present invention substantially departs from the conventional concepts and designs of the prior art, and in so doing provides an apparatus primarily developed for the purpose of retaining documents in a protected manner while allowing easy and convenient access to the documents.

SUMMARY OF THE INVENTION

In view of the foregoing disadvantages inherent in the known types of document retaining devices now present in the prior art, the present invention provides a new document retaining system construction wherein the same can be utilized for retaining documents in a protected manner while allowing easy and convenient access to the documents.

The general purpose of the present invention, which will be described subsequently in greater detail, is to provide a new document retaining system that has many of the advantages of the document retaining devices mentioned heretofore and many novel features that result in a new document retaining system which is not anticipated, rendered obvious, suggested, or even implied by any of the prior art document retaining devices, either alone or in any combination thereof.

To attain this, the present invention generally comprises a base having a pair of opposing slots, and a cover having a pair of opposing pins that are slidably positioned within the slots. The cover is formed to removably fit within the interior cavity of the base and for removably covering the interior cavity of the base. Various documents may be stored and utilized within the base and the cover along with various auxiliary devices such as clamps and partition members.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a document retaining system that will overcome the shortcomings of the prior art devices.

An object of the present invention is to provide a document retaining system that retains documents in a protected manner while allowing easy and convenient access to the documents.

Another object is to provide a document retaining system that allows document to be easily accessed.

An additional object is to provide a document retaining system that does not interfere with normal usage of the documents.

A further object is to provide a document retaining system wherein during usage the cover is not significantly exposed and does not interfere with the individual utilizing the document retaining system.

Another object is to provide a document retaining system that is lightweight.

An additional object is to provide a document retaining system that effectively protects documents from damage.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 10 is an end view of the alternative embodiment in the compact open position showing the pins catchably retained within the locking grooves.

DESCRIPTION OF THE PREFERRED EMBODIMENT

Figure 1:
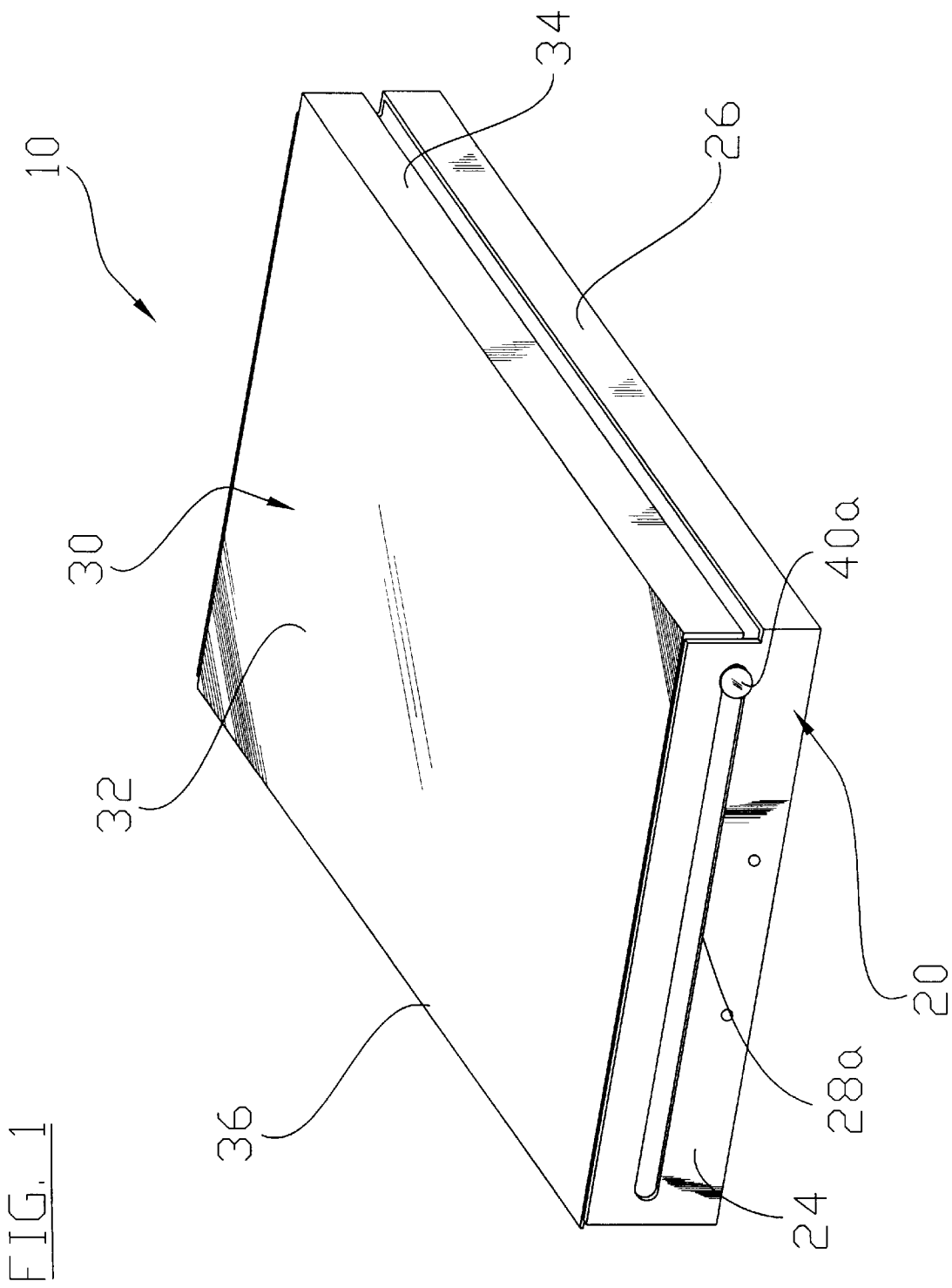
FIG. 1 is an upper perspective view of the present invention in the closed position.

Turning now descriptively to the drawings, in which similar reference characters denote similar elements throughout the several view, FIGS. 1 through 7 illustrate a document retaining system 10, which comprises a base 20 having a pair of opposing slots 28a–b, and a cover 30 having a pair of opposing pins 40a–b that are slidably positioned within the slots 28a–b. The cover 30 is formed to removably fit within the interior cavity of the base 20 and for removably covering the interior cavity of the base 20. Various documents may be stored and utilized within the base 20 and the cover 30 along with various auxiliary devices such as clamps 70, 72 and partition members 74. The base 20 and cover 30 may be constructed of various materials such as but not limited to aluminum, steel or plastic.

The base 20 and cover 30 have three basic positions with respect to one another. Utilizing these three positions of the document retaining system 10, a user is able to conveniently store and access documents within a single compact structure that does not interfere with their usage.

The first position of the document retaining system 10 is comprised of the "closed" position as illustrated in FIGS. 1. The closed position provides protection of documents contained within the document retaining system 10.

Figure 3:
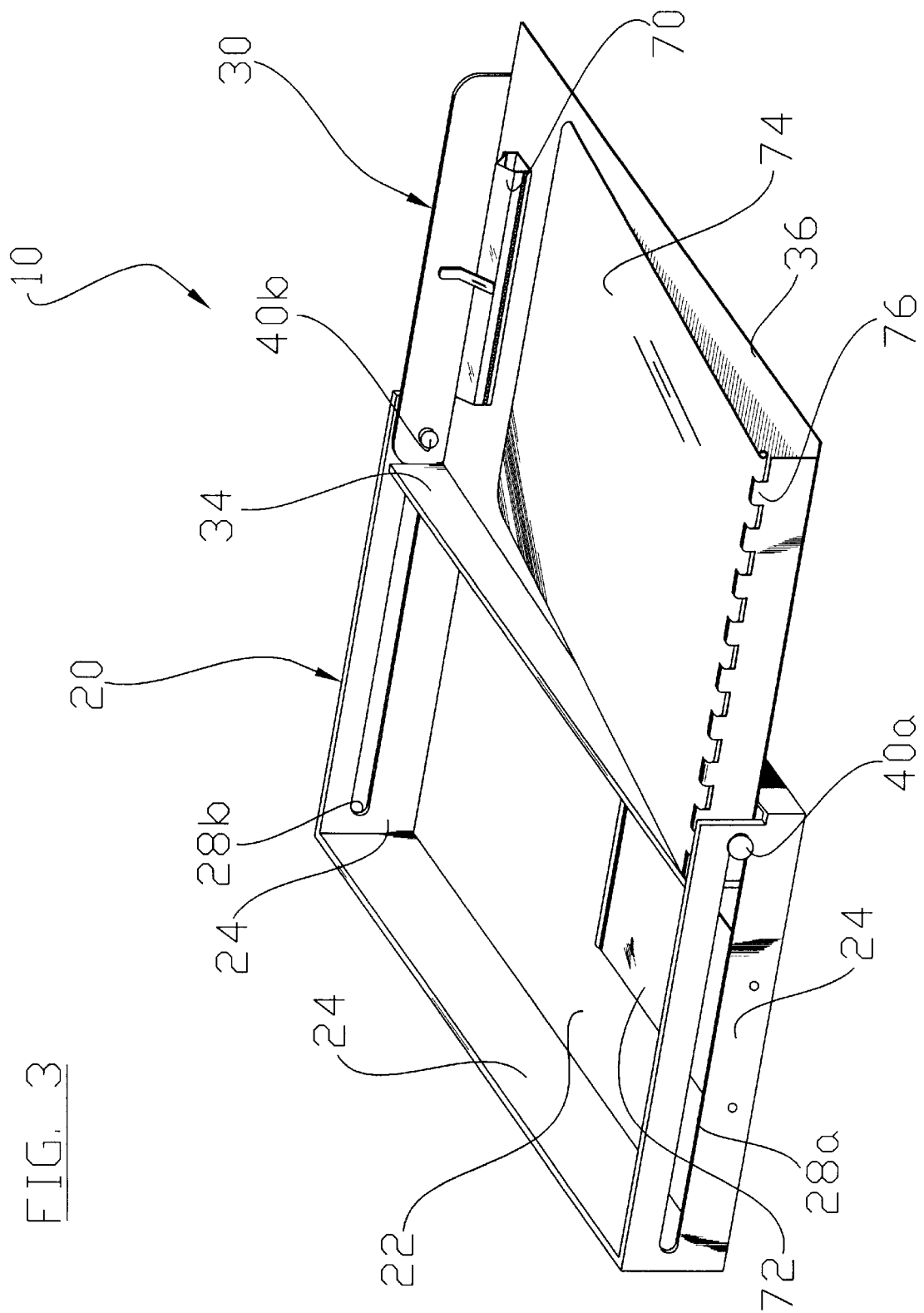
FIG. 3 is an upper perspective view of the present invention with the cover positioned in the normal open position with respect to the base.
Figure 4:
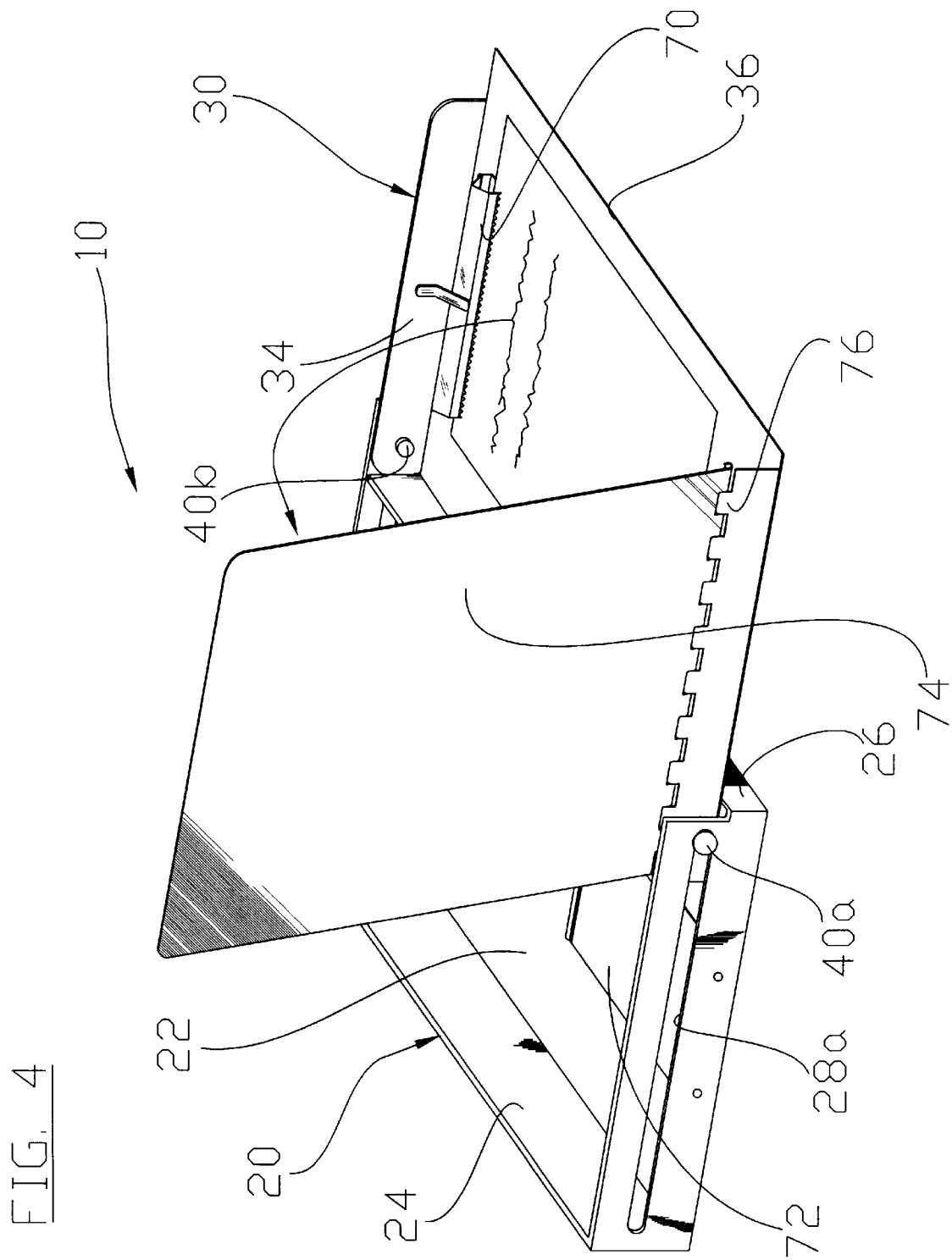
FIG. 4 is an upper perspective view of the present invention in the normal open position with the partition member pivoted upwardly.
Figure 7:
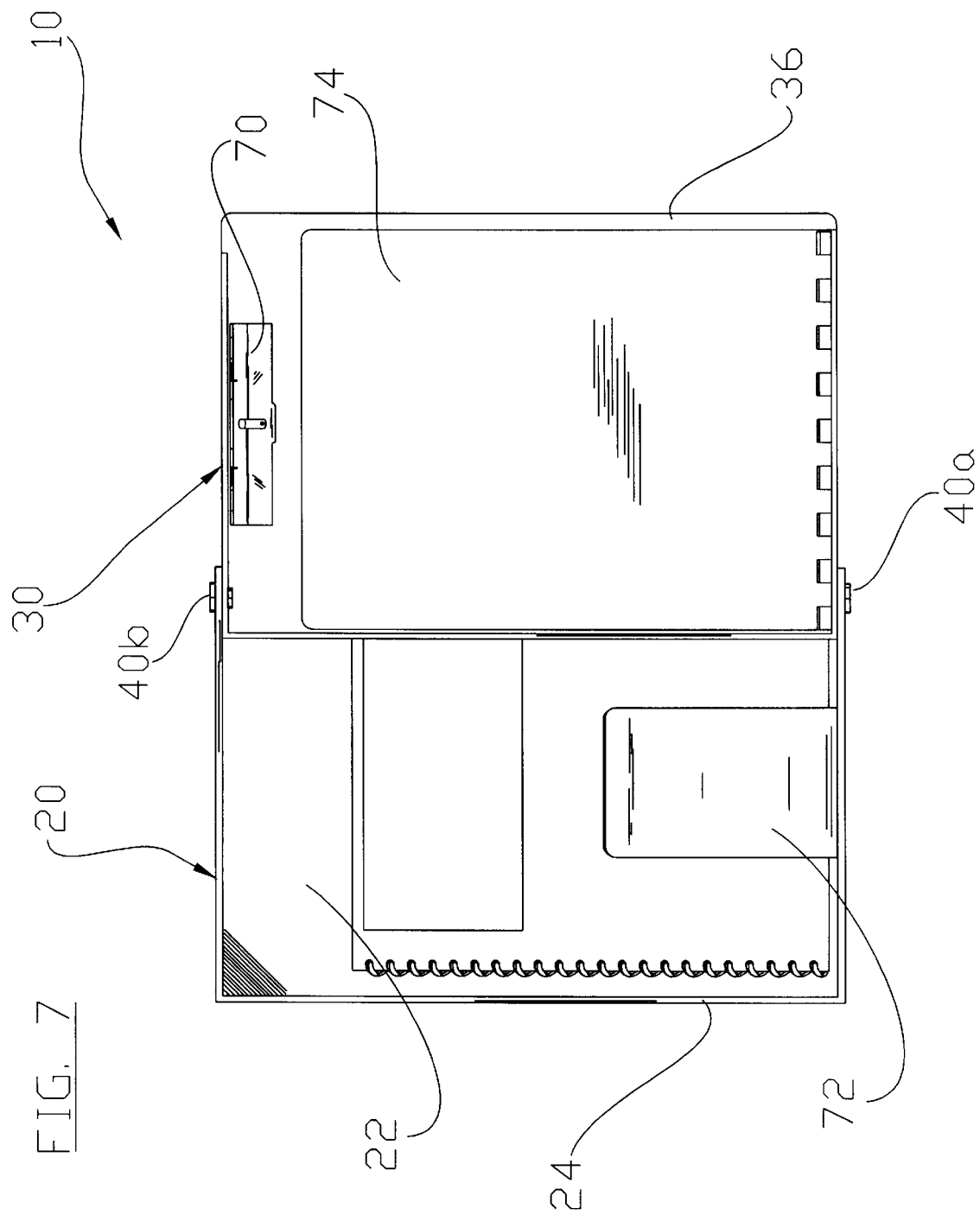
FIG. 7 is a top view of the present invention in the normal open position.

The second position of the document retaining system 10 is comprised of the "open" position as illustrated in FIGS. 3, 4 and 7 of the drawings. The open position is simply the cover 30 rotated 180 degrees with respect to the base 20.

Figure 5:
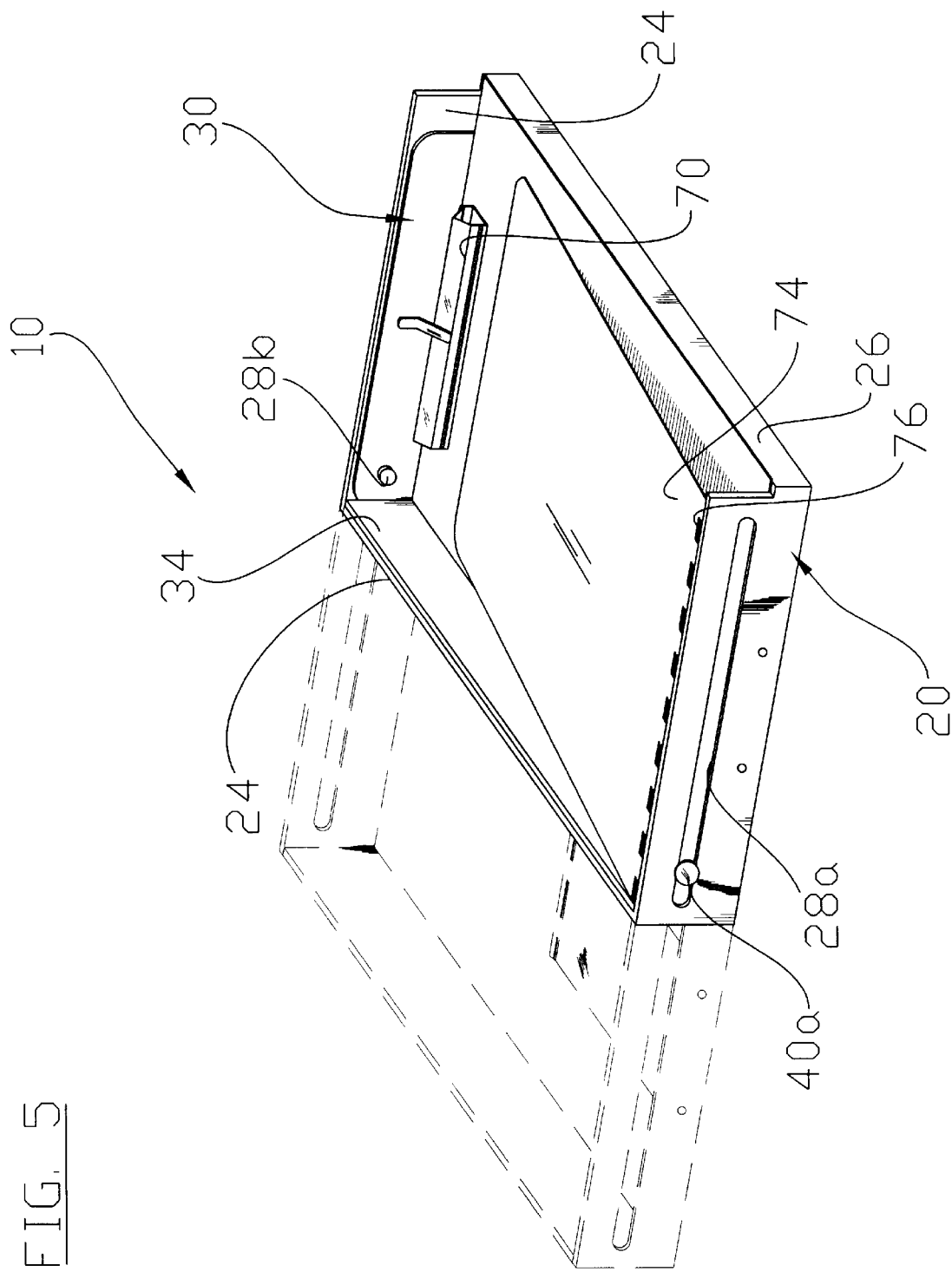
FIG. 5 is an upper perspective view of the present invention showing the base being slid about the cover from the normal open position into the compact open position.
Figure 6:
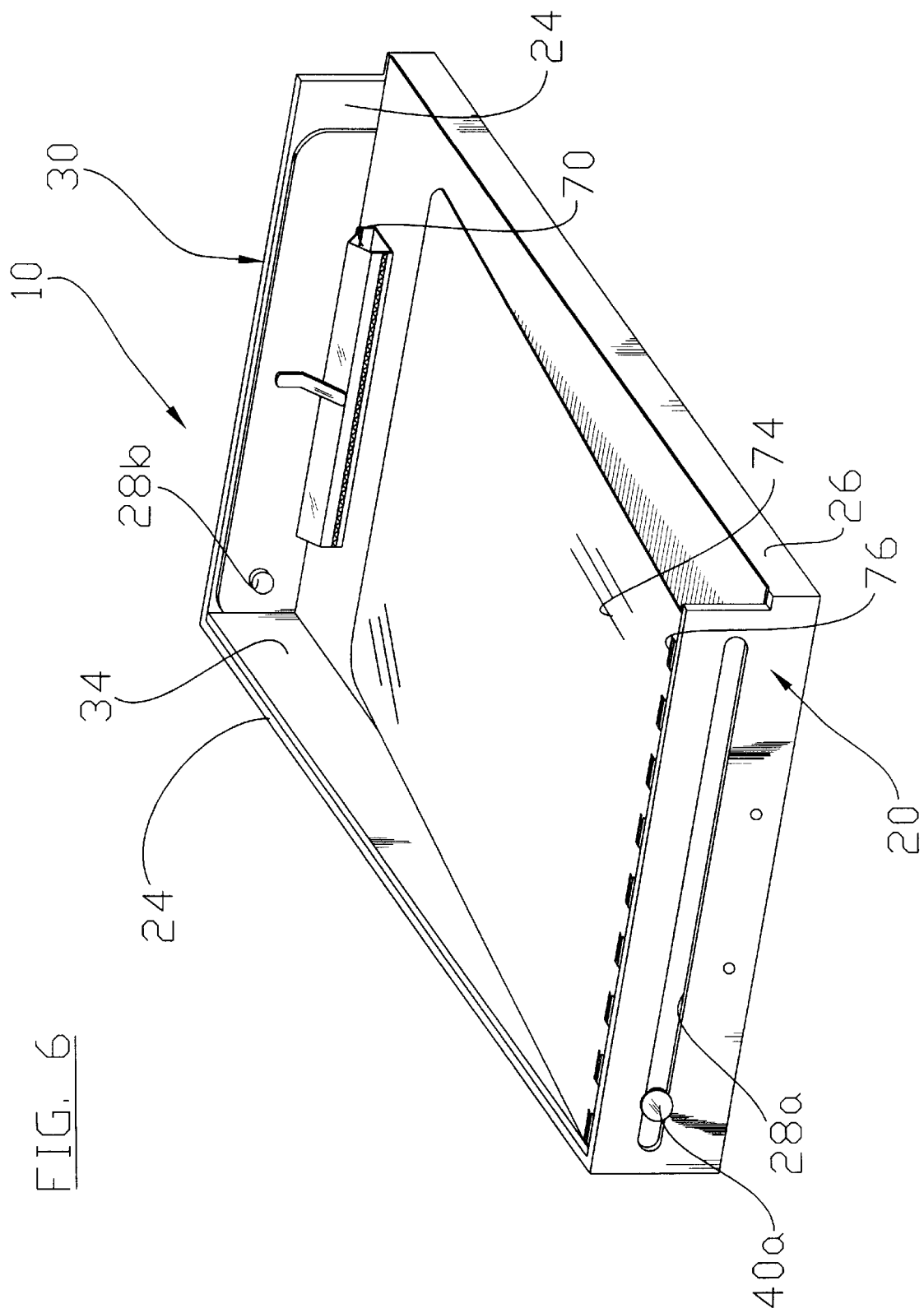
FIG. 6 is an upper perspective view of the present invention showing the cover compactly positioned within the base in the compact open position.

The third position of the document retaining system 10 is comprised of the "compact open" position as illustrated in FIGS. 5 and 6 of the drawings. The compact open position is wherein the cover 30 is slid into the base 20 (or the base 20 slid about the cover 30) from the open position as best illustrated in FIG. 5 of the drawings. Only the documents attached within the interior portion of the cover 30 are accessible when the document retaining system 10 is positioned within the compact open position.

Figure 2:
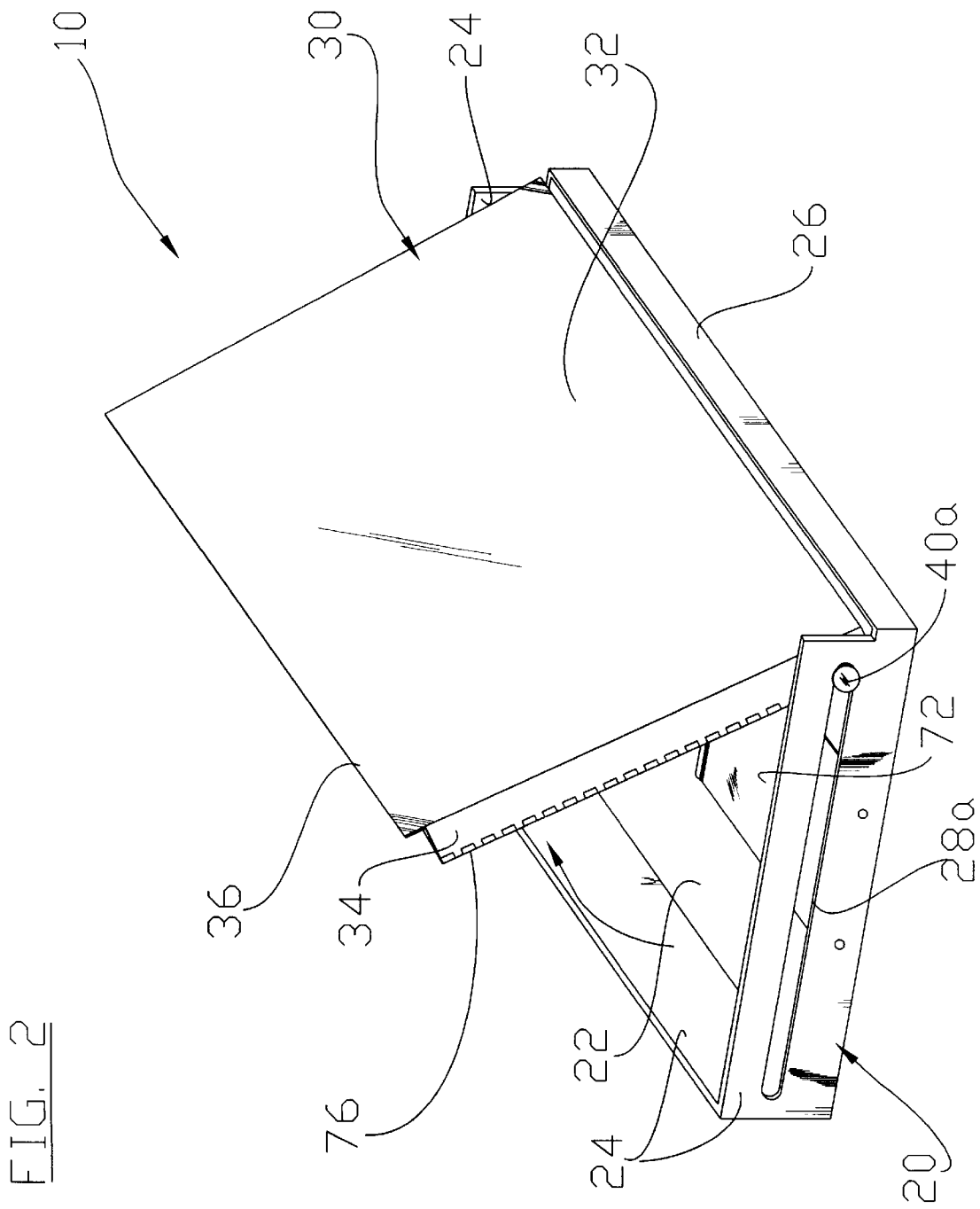
FIG. 2 is an upper perspective view of the present invention being opened.

The base 20 is preferably comprised of a rectangular or square shape as best shown in FIG. 7 of the drawings. As best shown in FIGS. 2 and 3 of the drawings, the base 20 is comprised of a floor 22, three first side walls 24 forming a U-shape about the perimeter of the floor 22, and an end wall 26. The end wall 26 is lower in height than the first side walls 24 as best illustrated in FIGS. 2 and 6 of the drawings.

The first side walls 24 are preferably constructed of an approximately equal height with respect to the floor 22. The first side walls 24 and the end wall 26 preferably extend orthogonally from the outer portion of the floor 22. It can be appreciated that the base 20 may be comprised of various other structures and designs to accomplish the desired functionality of the present invention.

As best shown in FIG. 3 of the drawings, a pair of opposing slots 28a–b extend through two of the opposing first side walls 24. The slots 28a–b extend along a significant portion of the opposing first side walls 24 as best shown in FIG. 3 of the drawings. The slots 28a–b are preferably parallel to the floor 22, however angled slots 28a–b may also be utilized to accomplish various functions.

As shown in FIGS. 1 through 7 of the drawings, a cover 30 is provided that is both pivotally and slidably positioned within the base 20. The cover 30 is formed to fit substantially within the cavity of the base 20 defined by the first side walls 24 when in the compact open position as best illustrated in FIGS. 5 and 6.

The cover 30 is comprised of an upper plate 32, and three second side walls 34 extending from the outer portion of the upper plate 32 similar to the first side walls 24. Two of the second side walls 34 are in opposition to one another with the remaining second side wall 34 extending between the opposing second side walls 34 forming a U-shaped structure similar to the first side walls 24. The two opposing second side walls 34 are spaced together closer than the opposing first side walls 24 to allow the second side walls 34 to be positioned between the opposing first side walls 24 as shown in FIGS. 2 through 7 of the drawings. The second side walls 34 are preferably constructed of an approximately equal height with respect to the upper plate 32. It can be appreciated that the cover 30 may be comprised of various other structures and designs to accomplish the desired functionality of the present invention. A portion of the upper plate 32 preferably extends past the first side walls 24 forming a lip 36 that is easy to engage by a user.

As shown in FIGS. 3 through 7 of the drawings, a pair of pins 40a–b are attached to the two opposing second side walls 34 of the cover 30. The pins 40a–b are slidably and pivotally received within the corresponding pair of slots 28a–b as further shown in FIGS. 3 through 7 of the drawings. The pins 40a–b are preferably comprised of a flanged end structure to prevent accidental removal from the slots 28a–b. The pins 40a–b are preferably located adjacent the second side wall 34 positioned between the opposing second side walls 34 opposite of the lip 36 of the upper plate 32 as best illustrated in FIG. 6 of the drawings.

Various auxiliary devices may be secured within the base 20 and the cover 30 for securing and supporting various documents. For example, a gripping clamp 70 may be secured to the upper plate 32 of the cover 30 for removably securing documents and other items. In addition, a partition member 74 may be pivotally attached to one of the second side walls 34 by a hinge 76 or other means for separating documents and providing a writing surface for documents during usage as further shown in FIGS. 3 through 7 of the drawings. A plate clamp 72 may be secured to the floor 22 of the base 20 for retaining documents and other items as shown in FIGS. 2, 3, 4 and 7 of the drawings. It can be appreciated that various other auxiliary devices may be utilized within the base 20 and cover 30 with various combinations capable of being utilized.

Figure 8:
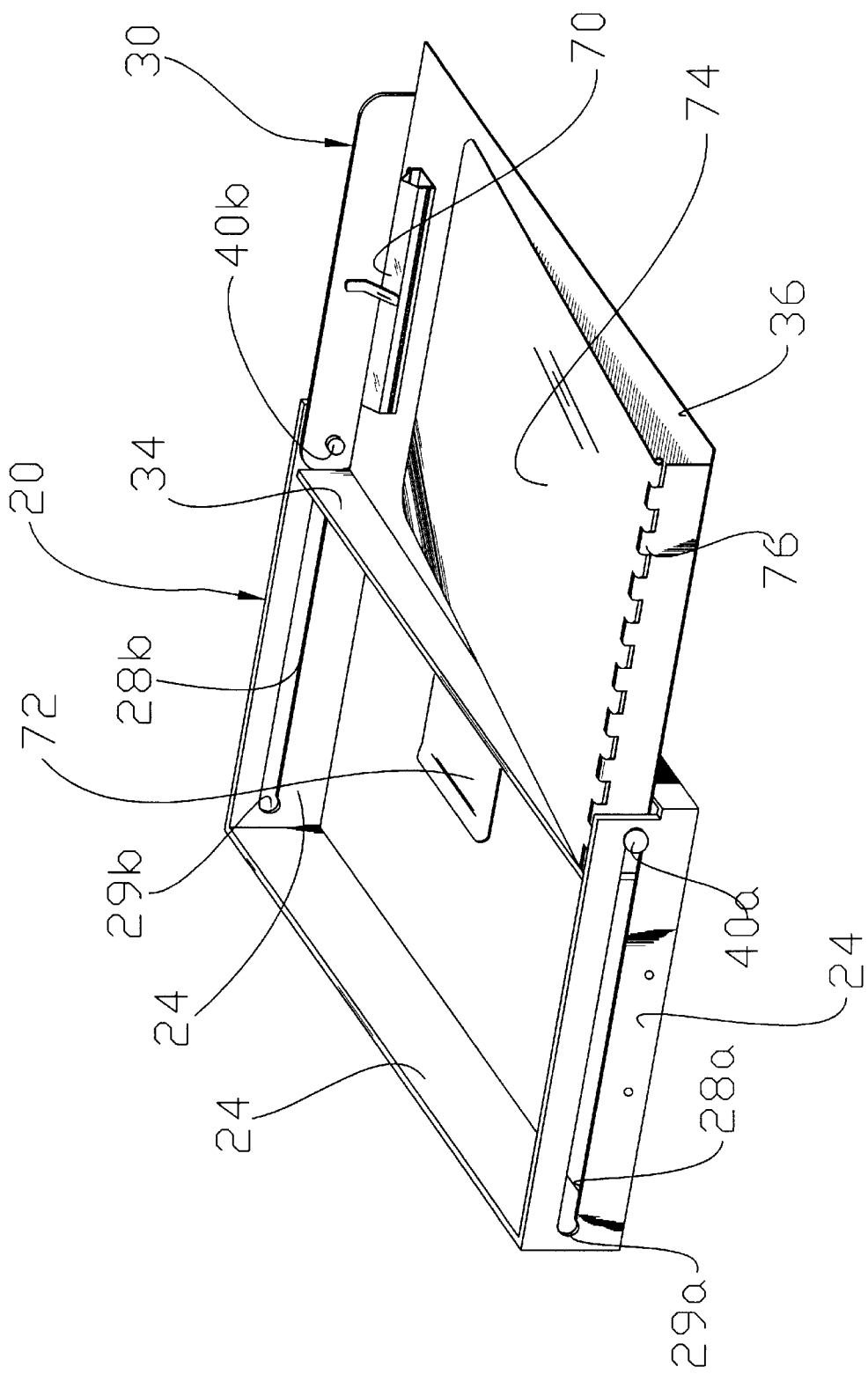
FIG. 8 is an upper perspective view of an alternative embodiment of the present invention illustrating the locking grooves.
Figure 9:
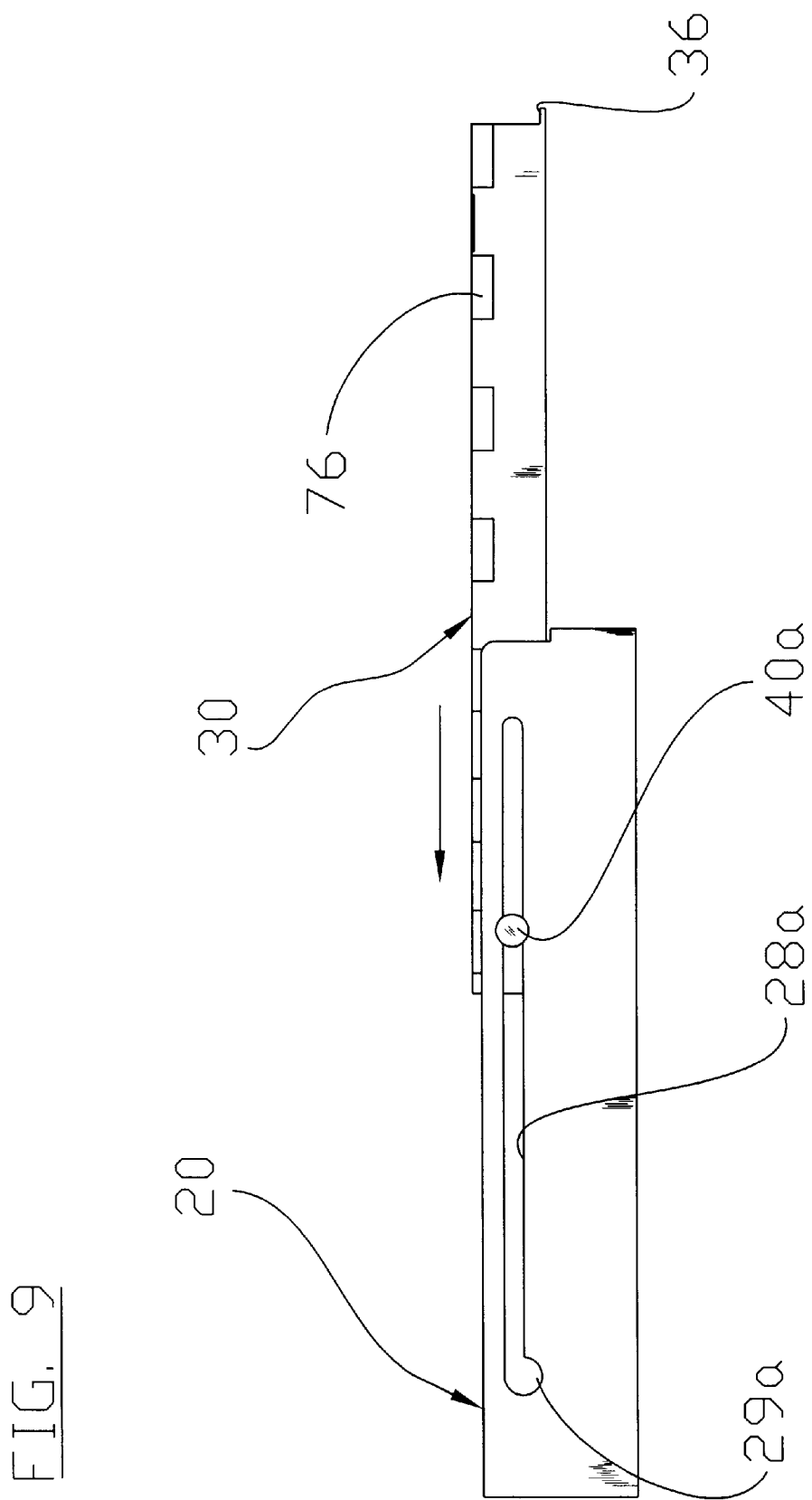
FIG. 9 is an end view of the alternative embodiment in the open position showing the locking groove within the slot.

In an alternative embodiment shown in FIGS. 8 through 10 of the drawings, a pair of locking grooves 29a–b extend orthogonally downwardly from the end of each of the slots 28a–b. The hinge pins 40a–b removably catch upon the locking grooves 29a–b when the cover 30 is in the compact open position for preventing movement of the cover 30 while the user is manipulating documents within the document retaining system 10 as is best illustrated in FIG. 10 of the drawings.

In use, the user positions the document retaining system 10 within the open position thereby exposing both the base 20 and the cover 30. The user then inserts the desired documents and other materials within the base 20 and cover 30 as desired utilizing various auxiliary devices to retain the same. The user then rotates the cover 30 180 degrees with respect to the base 20 so that the cover 30 substantially encloses the cavity of the base 20 thereby forming the "closed" position. The documents and other materials within the document retaining system 10 are thereafter properly protected from various damaging events. The closed position of the document retaining system 10 both stores and protects valuable documents contained within while simultaneously providing a compact structure to transport and store. When the user desires to access the documents contained within the document retaining system 10, the user simply engages the lip 36 of the cover 30 and rotates the cover 30 away from the base 20 as shown in FIG. 2 of the drawings. The user continues rotating the cover 30 until approximately 180 degrees wherein the outer surface of the upper plate 32 engages the end wall 26 thereby supporting the cover 30 in a substantially parallel position with respect to the base 20 forming the "open" position as best illustrated in FIGS. 3 and 4 of the drawings. The user may then access documents within either the base 20 or the cover 30 as best shown in FIG. 7 of the drawings. If the user desires to utilize the documents contained only within the cover 30, the user then may slide the cover 30 into the base 20 as best illustrated in FIG. 5 of the drawings. When the U-shaped structure of the second side walls 34 engages the corresponding U-shaped structure of the first side walls 24 the document retaining system 10 is positioned within the compact storage position as shown in FIGS. 5 and 6 of the drawings. The user is then free to access the documents within the cover 30 and utilize the various auxiliary devices contained within. When the user is finished accessing the documents within the document retaining system, the user simply reverses the above procedure until the cover 30 is substantially enclosing the cavity of the base 20 thereby forming the closed position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A document retaining system having a closed position, an open position and a compact open position, comprising:
   a base having a floor and a pair of first side walls extending from said floor on opposing ends of said base;
   a pair of slots extending through said pair of first side walls;
   a cover pivotally and slidably positioned within said base between said pair of first side walls; and
   a pair of hinge pins attached to said cover, wherein said pair of hinge pins are pivotally and slidably positioned within said pair of slots.

2. The document retaining system of claim 1, wherein said hinge pins have flanged ends.

3. The document retaining system of claim 2, wherein said cover is comprised of an upper plate and a plurality of second side walls extending from the outer portion of said upper plate.

4. The document retaining system of claim 3, wherein said base includes an end wall extending between said pair of first side walls, wherein said end wall is shorter in height than said pair of first side walls.

5. The document retaining system of claim 4, wherein said pair of slots are parallel to one another.

6. The document retaining system of claim 5, wherein said cover includes three second side walls forming a U-shaped structure with said pair of hinge pins attached to said second side walls in opposition to one another adjacent the closed portion thereof, and wherein said base includes an extended side wall that extends between said pair of first side walls opposite of said end wall.

7. The document retaining system of claim 6, wherein said three second side walls are orthogonally attached to said upper plate, and wherein said pair of first side walls and said extended side wall are orthogonal with respect to said floor.

8. The document retaining system of claim 7, wherein said cover and said base both include auxiliary devices for retaining documents within.

9. The document retaining system of claim 8, including a pair of locking grooves extending downwardly from the distal ends of said slots for catchably receiving said hinge pins when said cover is within a compact open position.

10. The document retaining system of claim 9, wherein said cover includes a lip portion that extends past said extended side wall when in said closed position and extends past said end wall when in said compact open position.

11. A document retaining system having a closed position, an open position and a compact open position, comprising:
- a base having a floor and a pair of first side walls extending from said floor on opposing ends of said base;
- a pair of slots extending through said pair of first side walls, wherein each of said pair of slots extends along a substantial portion of each of said pair of first side walls;
- a cover pivotally and slidably positioned within said base between said pair of first side walls; and
- a pair of hinge pins attached to said cover, wherein said pair of hinge pins are pivotally and slidably positioned within said pair of slots.

12. The document retaining system of claim 11, wherein said hinge pins have flanged ends.

13. The document retaining system of claim 12, wherein said cover is comprised of an upper plate and a plurality of second side walls extending from the outer portion of said upper plate.

14. The document retaining system of claim 13, wherein said base includes an end wall extending between said pair of first side walls, wherein said end wall is shorter in height than said pair of first side walls.

15. The document retaining system of claim 14, wherein said pair of slots are parallel to one another.

16. The document retaining system of claim 15, wherein said cover includes three second side walls forming a U-shaped structure with said pair of hinge pins attached to said second side walls in opposition to one another adjacent the closed portion thereof, and wherein said base includes an extended side wall that extends between said pair of first side walls opposite of said end wall.

17. The document retaining system of claim 16, wherein said three second side walls are orthogonally attached to said upper plate, and wherein said pair of first side walls and said extended side wall are orthogonal with respect to said floor.

18. The document retaining system of claim 17, wherein said cover and said base both include auxiliary devices for retaining documents within.

19. The document retaining system of claim 18, including a pair of locking grooves extending downwardly from the distal ends of said slots for catchably receiving said hinge pins when said cover is within a compact open position.

20. The document retaining system of claim 19, wherein said cover includes a lip portion that extends past said extended side wall when in said closed position and extends past said end wall when in said compact open position.

* * * * *